United States Patent
Mayer et al.

(10) Patent No.: US 7,286,078 B2
(45) Date of Patent: Oct. 23, 2007

(54) RADAR SYSTEM FOR MOTOR VEHICLES

(75) Inventors: Hermann Mayer, Vaihingen (DE); Bernhard Lucas, Besigheim (DE); Joerg Hilsebecher, Gerlingen (DE); Joachim Hauk, Renningen-Malmsheim (DE); Dirk Meister, Moeglingen (DE); Ulf Wilhelm, Rutesheim (DE); Paco Haffmans, Boeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 11/241,301

(22) Filed: Sep. 29, 2005

(65) Prior Publication Data

US 2006/0156076 A1 Jul. 13, 2006

(30) Foreign Application Priority Data

Sep. 29, 2004 (DE) ............ 10 2004 047 176

(51) Int. Cl.
*G01S 13/93* (2006.01)
*G01S 7/292* (2006.01)

(52) U.S. Cl. .................. 342/70; 342/192; 342/195
(58) Field of Classification Search .......... 342/70–72, 342/192, 195, 196
See application file for complete search history.

(56) References Cited

U.S. PATENT DOCUMENTS 6,031,483 A * 2/2000 Urabe et al. .............. 342/70
6,121,917 A * 9/2000 Yamada .................. 342/128
6,198,426 B1 * 3/2001 Tamatsu et al. ........... 342/70
6,275,180 B1 * 8/2001 Dean et al. ............... 342/70
6,747,592 B2 * 6/2004 Nakamura ................ 342/70
7,023,376 B1 * 4/2006 Kuroda et al. ............. 342/70
7,123,184 B2 * 10/2006 Shono ..................... 342/89
7,230,565 B2 * 6/2007 Nakanishi et al. ......... 342/70
2004/0183716 A1 * 9/2004 Shono ..................... 342/82
2004/0189513 A1 * 9/2004 Shono ..................... 342/70
2004/0257268 A1 * 12/2004 Aker et al. ............. 342/114

FOREIGN PATENT DOCUMENTS

DE 42 16 406 11/1993
DE 199 224 11 10/2000

OTHER PUBLICATIONS

Ganguli A. et al.: "Target tracking and radar health monitoring for highway vehicle applications" Proceedings of the 2002 American Control Conference ACC, Anchorage, Al 08—Jan. 5, 2002, New York, IEEE, US, Bd. vol. 1 of 6, S. 3696-3701, XP010596952.

* cited by examiner

*Primary Examiner*—John B Sotomayor
(74) *Attorney, Agent, or Firm*—Kenyon & Kenyon LLP

(57) ABSTRACT

A radar system for motor vehicles, having an antenna, a first processor which is developed to transform signals supplied by the antenna via a primary signal path into a spectrum, and a second processor for the additional evaluation of the spectrum, wherein at least a part of the signals received by the antenna is able to be supplied to the second processor via a redundant signal path while by-passing the first processor, and the second processor, on its part, is designed to transform these signals into a spectrum.

5 Claims, 3 Drawing Sheets

RADAR SYSTEM FOR MOTOR VEHICLES

FIELD OF THE INVENTION

The present invention relates to a radar system for motor vehicles, having an antenna, a first processor which is developed to transform signals supplied by the antenna via a primary signal path into a spectrum, and a second processor for the additional evaluation of the spectrum.

BACKGROUND INFORMATION

Radar systems are used in motor vehicles, for example, for adaptive cruise control, and have the function of locating other vehicles, so that the distance of one's own vehicle from a vehicle traveling ahead is automatically controlled.

A commonly used radar system for these purposes is an FMCW radar (frequency modulated continuous wave). What is involved in this system is a continuous wave radar in which the frequency of the radar signal sent by the antenna is modulated in a ramp-shaped manner. The radar echo, received by the antenna at a certain point in time, is mixed with the radar signal sent at the same point in time, so that by beats one obtains a lower frequency mixer signal whose frequency corresponds to the frequency difference between the sent and the received signal. This frequency difference is a function, on the one hand, of the signal propagation time, and, with that, of the distance of the radar target, and, on the other hand, because of the Doppler effect, of the relative speed of the radar target.

The mixer signal is digitized and is sampled in each measuring cycle over a time span that is approximately equivalent to the duration of the frequency ramp, and is transformed into a spectrum, for instance, by rapid Fourier transformation (FFT). In this spectrum, then, each located radar target is represented by a peak at a certain frequency. The ambiguity between the distance-dependent and the relative speed-dependent frequency proportion is removed in that the sent radar signal in each measuring cycle is modulated using different ramp slopes, for instance, once using a rising ramp and once using a falling ramp having the same slope, as an absolute value. If one then forms the sum of the frequencies of the mixer signal that were obtained for the rising and the falling ramp, the propagation time-dependent proportions mutually cancel out, so that one obtains a measure for the Doppler shift, and therewith the relative speed. If the two frequencies are subtracted from each other, the speed-dependent proportions cancel out, and one obtains a measure for the distance apart.

In order to be able to assign the located vehicles correctly to the various lanes of the roadway, one may work with radar system having angular resolution. For instance, the antenna has several antenna patches situated in the focal plane of a common microwave lens, so that several slightly angularly offset radar lobes are generated. The evaluation described above is then separately carried out for each channel, that is, for each patch, and, by comparison of the amplitudes and/or the phases of the signals included in the various channels for the same radar target, one may at least approximately determine the azimuth angle of the radar target.

In an architecture that has been common up to now, of the evaluation electronics system, one works with only one single signal path, in which the mixer signals of the various channels are digitized and supplied to the first processor, for example, a digital signal processor (DSP), whose main task it is to calculate the corresponding spectrum for each channel. The additional evaluation then takes place using a separate second processor, such as a microcontroller (μC). This microcontroller fulfills manifold tasks, among other things, the removal of the above-mentioned ambiguity, the determination of the azimuth angles of the radar targets over several measuring cycles (tracking), the selection of a target object for the clearance control and finally, the clearance control by intervention in the drive system and/or the braking system of the vehicle.

In order that the traffic situation may be evaluated sufficiently reliably, the radar measurements have to be repeated at a short cycle time, for instance, at a period of a few milliseconds. It follows that the digital signal processing in the processors has to take place at high speed and using a correspondingly high data throughput, so that the appearance of errors in the signal path cannot always be avoided. Such errors may be caused, for example, by interspersed noise signals, bit A1 liasing and the like.

Up to the present, ACC systems have generally been installed for travel at relatively high driving speeds on superhighways or expressways, that is, in situations in which the vehicle clearances are relatively great, the dynamics of the traffic events are comparatively low, and, in particular, one does not have to anticipate standing obstacles in the traffic lane. There have been attempts made, however, to broaden the functionality of radar-assisted driver assistance systems, and especially to extend them into the lower speed range. An example for such a broadening of the function is, for instance, a stop-and-go function which, for example, when driving up to the end of a traffic jam, makes it possible automatically to brake one's own vehicle to a standstill, and which possibly also makes possible automatically driving off again as the congestion lifts. Other examples of function broadening are so-called pre-crash functions, such as the automatic initiation of emergency braking when the danger of a collision is detected, preparatory activation of passive safety systems, such as air bags and belt tensioners, and the like. For these functions, naturally, high safety standards apply, so that even sporadic malfunctions of the radar system are no longer able to be tolerated to the same extent as took place up to now.

SUMMARY OF THE INVENTION

The present invention offers the advantage that the reliability of the radar system is increased.

According to the present invention, a second, redundant signal path is provided, via which the received signals, or more accurately speaking, the mixer signals, while bypassing the first processor, are supplied directly to the second processor, that is, for example, the microcontroller. The microcontroller now acquires the additional function of autonomously transforming the signals supplied on the second signal path into the corresponding spectra. In this way, the redundancy of the system is increased, and one obtains spectra gained independently of one another, which may be tested for agreement and consistency, so that possible errors may be detected rapidly and securely, and, if necessary, suitable countermeasures may be taken.

Thus, for example, if there is a discrepancy between mutually corresponding spectra, the result for the current measuring cycle may be discarded in order to avoid that an undesired error response of the system is triggered. If such discrepancies occur frequently or permanently, this points to a system error or hardware fault, and the suitable countermeasure would then be a restart and/or a switching off of the system, in conjunction with a warning notice to the driver.

If the error is not removed even by the restart, the driver may be requested, by an indication on a display, to look for a repair shop.

A special advantage of the present invention is that the greater redundancy is able to be achieved by relying extensively on system components that are present anyway, so that only slight modifications are required on the system that is present, and practically no additional calculating capacity has to be made available. In this context, among other things, the circumstance is made use of that the capacity utilization of the microcontroller is subject to fluctuations in time, since it is a function, for example, of the traffic density. Since the microcontroller is designed for a possible peak load, in general it will have sufficient reserve capacity to be able to take over the additional tasks transferred to it by the present invention. In view of the multiplicity of tasks of the microcontroller, there is also the possibility of weighting these tasks according to priorities, and, if necessary, to set back tasks of lesser importance in favor of those of higher priority.

Preferably, the second signal path includes its own analog/digital converter. For instance, a converter may be used for this that is present in any case in the standard component used as microcontroller. The two signal paths thus include the analog/digital conversion, so that, on account of mutual control, errors in the digitizing of the data may also be detected.

The present invention optionally permits, depending on the specific embodiment or possibly depending on the situation, a complete self-control by permanent adjustment of the spectra in all channels, or a limited control based on random sampling. It is possible, for example, to use the redundant signal path only for one of the several channels, that is, only for the signal of one of the several mixers. Since the digitization of the data and the rapid Fourier transformation in the primary signal path is performed for all the channels using the same hardware and the same algorithm, serious errors or a significantly increased error frequency may also be detected if, in the redundant path, only the spectrum for one channel is calculated and compared to the corresponding spectrum from the primary path. The load on the microcontroller is thereby reduced considerably. An even greater reliability without additional load on the microcontroller may be achieved by, in each case, using the redundant path in successive measuring cycles for another channel.

The algorithm that is used in the microcontroller, that is, in the second processor, for the rapid Fourier transformation, may especially be adapted to the architecture of the microcontroller, and is preferably not identical to the algorithm that was used in the first processor. This makes it possible also to track down software errors which, in practice, become noticeable only sporadically, in response to rare, particularly unfavorable constellations. It is also possible to calculate the spectrum in the redundant path using a lower resolution than in the primary path. For the additional evaluation of the spectra, one would then use the high resolution spectra from the primary path, and the resolution in the redundant path need only be so big, that conceivable errors may be detected using sufficient sensitivity. By this measure too, in an emergency, the work load of the microcontroller may be kept within admissible limits.

On the other hand, a specific embodiment, in which the microcontroller is designed in such a way that it can completely assume the functions of the first processor, has its special advantages. In this case, besides the possibility of carrying out a complete and permanent self-control in normal operation, there is also the possibility, in an emergency situation, such as when danger of a collision has been detected, of doing without redundancy, and of using the calculating capacity of the microcontroller, that is becoming free, for shortening the cycle time, so that, in the critical situation, the traffic events may be followed using a higher resolution in time. An additional shortening of the cycle time may be achieved in having the microcontroller and the first processor (DSP) share the work, in that the spectra for some channels are calculated by the first processor and, for the remaining channels, are calculated by the second processor.

DETAILED DESCRIPTION

Figure 1:
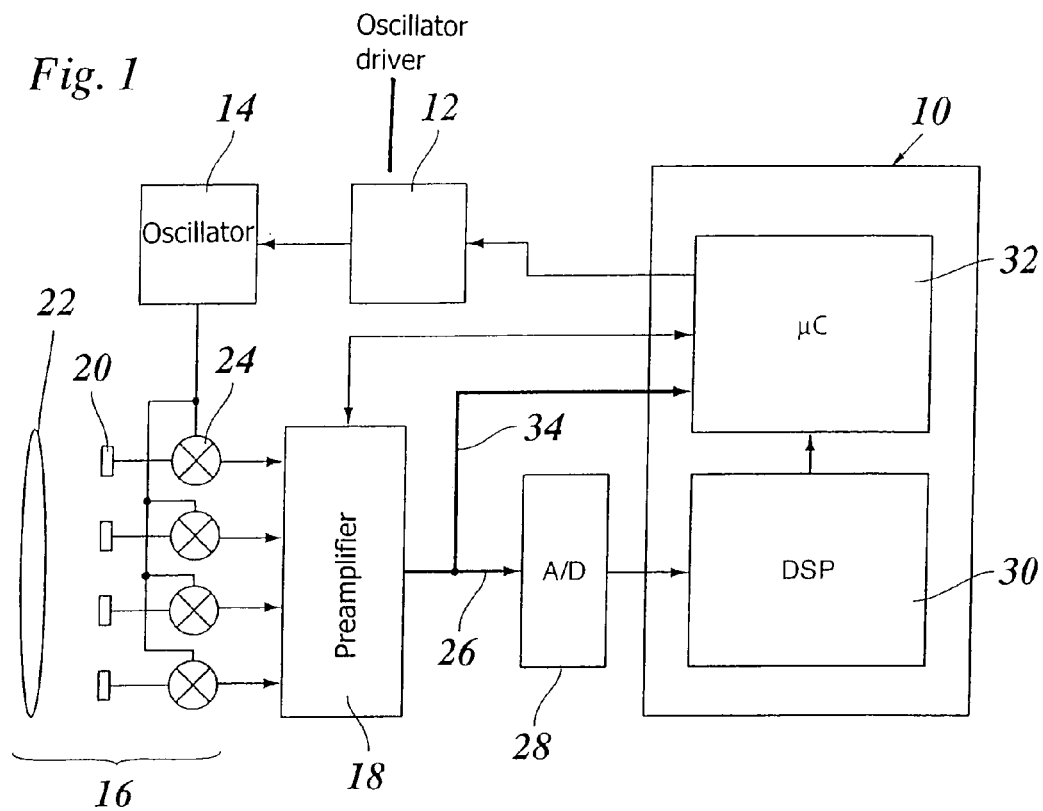
FIG. 1 shows a block diagram of a radar system according to the present invention.

The radar system shown in FIG. 1 includes an electronic control and evaluation unit 10, an oscillator driver 12, an oscillator 14, an antenna 16 and a preamplifier 18. In the example shown, antenna 16 has four antenna patches 20 that lie next to one another in the focal plane of a common microwave lens 22, and thus generate four radar beams or lobes that are fanned in width. The radar signal emitted by a single antenna patch 20 and reflected at a radar target is bundled again by microwave lens 22 and received by the same patch (monostatic construction). One mixer (24) is assigned to each antenna patch 20. In practice, mixers 24 are mostly disposed on a common board with antenna patches 20, and therefore they are regarded here as a part of antenna 16.

Oscillator driver 12 is controlled by the control and evaluation unit 10, and, on its part, controls the frequency of oscillator 14. The radar signal, having a ramp-shaped modulated frequency, generated by oscillator 14 is supplied via mixers 24 to antenna patches 20. The signal received by antenna patches 20 is mixed, in each mixer 24, with the signal of oscillator 14, and the low-frequency mixer signal obtained thereby is amplified in preamplifier 18. Preamplifier 18 is also controlled by control and evaluation unit 10.

A primary signal path 26 includes an analog/digital converter 28 which digitizes the analog output signal of preamplifier 18 for all four channels, and passes it on to a first processor 30, a digital signal processor (DSP) in control and evaluation unit 10. For a certain time period, which approximates the duration of a frequency modulation ramp of oscillator 14, the digitized data are sampled in an internal memory of first processor 30 and are then submitted channel by channel to a rapid Fourier transformation (FFT), so that, for each channel one obtains a digital frequency spectrum of the respective mixer signals. These spectra are then passed on to a second processor 32, a microcontroller (μC), of control and evaluation unit 10, and there they are further evaluated.

Each measuring cycle of the radar system includes several frequency modulation ramps that differ in their ramp slopes. Within an individual measuring cycle, one consequently obtains several sets of four spectra each, from which second processor 32 calculates the distances, the relative speeds and the azimuth angles of the located radar targets. The data thus calculated are then compared to the data from preceding measuring cycles, in order to follow the movements of the radar targets in the course of time. On this basis then, for example, a target object is selected, within the scope of an ACC system, for the vehicle clearance regulation, and the distance from the target object is controlled by intervention in the drive system and/or the braking system of the vehicle. These functions, too, may be wholly or partially executed by second processor 32, which, for this purpose, has available to it other system components of the vehicle, via internal memories and interfaces that are not shown.

In this respect, the construction and the method of functioning of the radar system described so far are equivalent to the related art. An important aspect of the system provided here is that, parallel to primary signal path 26, a redundant signal path 34 is provided, which connects the analog output of preamplifier 18 directly to second processor 32.

Figure 2:
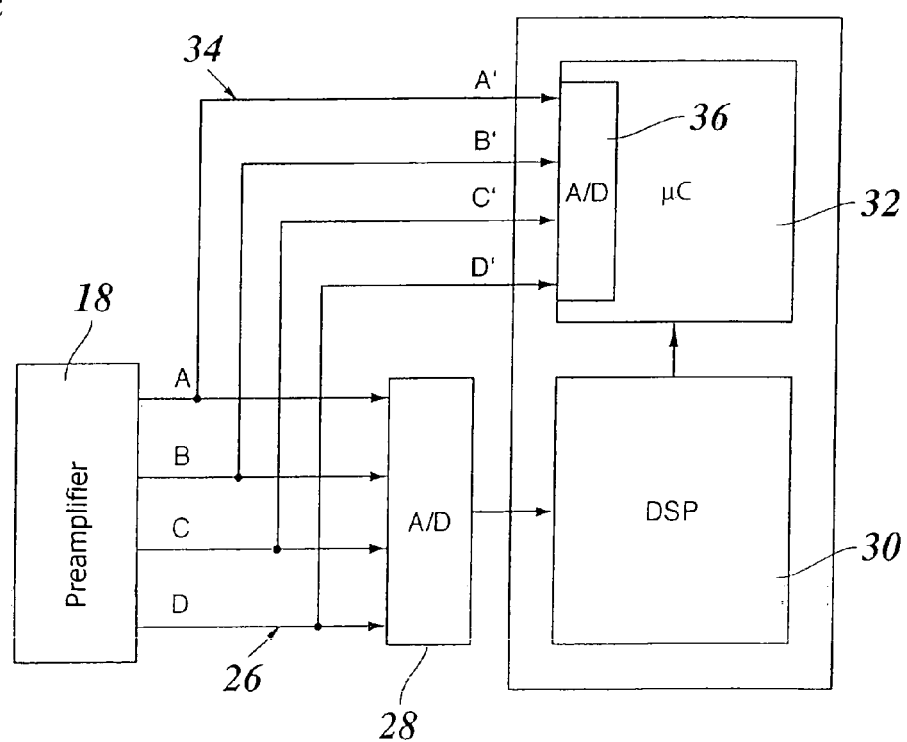
FIGS. 2 to 5 show detailed block diagrams for embodiments of a radar system according to different embodiment examples.

As shown in FIG. 2, second processor 32 has an integrated analog/digital converter 36. Primary signal path 26 includes four channels A, B, C and D, corresponding to the four mixers 24, and redundant signal path 34 includes four channels A', B', C' and D', which in each case branch off from the corresponding channel of the primary path, and lead to analog/digital converter 36 of second processor 32. The analog output signals of preamplifier 18 are consequently digitized once more independently in integrated analog/digital converter 36 of second processor 32. Second processor 32 is programmed in such a way that it submits the data supplied via redundant signal path 34, and digitized, to a rapid Fourier transformation, with the aid of its own algorithm, so that, for each spectrum, a corresponding reference spectrum is formed via the redundant path for each spectrum supplied by first processor 30. If no error has occurred in any of signal paths 26, 34, the reference spectra thus obtained essentially have to agree with the appertaining spectra delivered by first processor 30 (except for rounding errors). In this way it may be checked whether signal paths 26, 34 are operating free from error.

Analog/digital converters 26 and 36, which are assigned to the first and second processor respectively, have to be suitably synchronized with each other. This may be achieved, for example, by the exchange of synchronization signals between the first and the second processor. Such a synchronization signal, however, may optionally be modulated upon the radar signal generated by oscillator 14, perhaps in the form of a component having a characteristic frequency and/or amplitude, which may then be filtered out from the received signal and used for the synchronization.

In the exemplary embodiment described above, an appropriate reference spectrum is calculated for each spectrum that first processor 30 calculates. In modified specific embodiments, it is also possible to check primary signal path 26 only by random sampling, in the light of a few selected spectra.

Usually, the frequency of the emitted radar signals is modulated in each measuring cycle in such a way that two frequency ramps are formed having the opposite equal slope, and a third frequency ramp is formed having a lesser slope in absolute value. The third ramp is used to remove ambiguity in cases in which several target objects are being located simultaneously. In such a system, it may suffice, for example, if second processor 32 calculates only reference spectra for the first two ramps.

Figure 3:
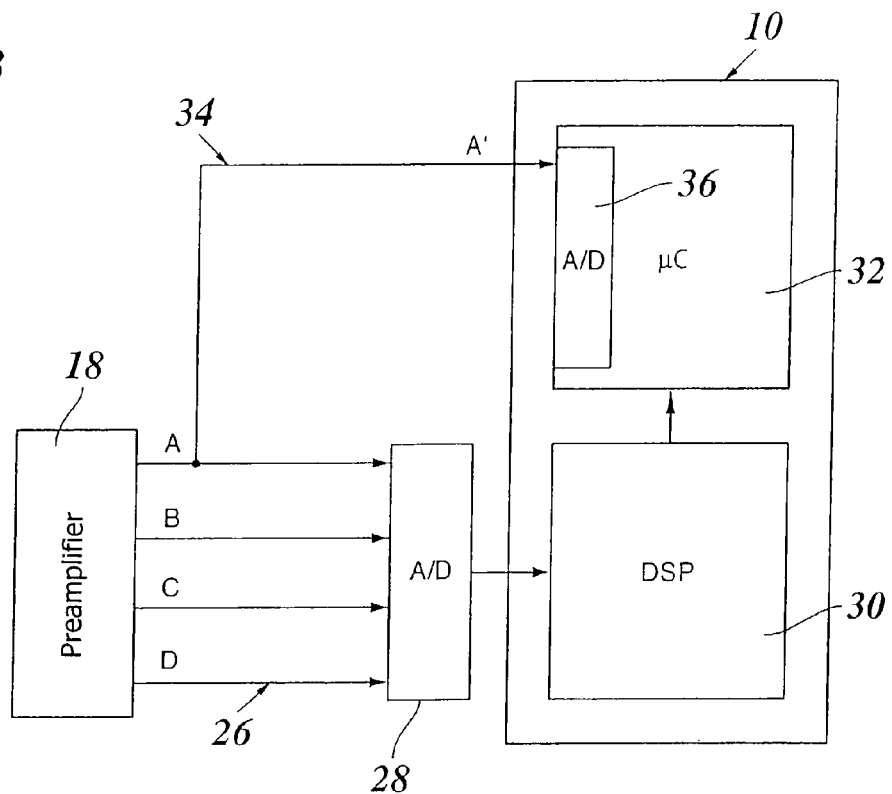

FIG. 3 shows an exemplary embodiment in which redundant signal path 34 has a single channel A', which branches off from channel A of primary signal path 26. Consequently, in this instance, only one reference spectrum is calculated for channel A' by second processor 32 in each measuring cycle and for each ramp, and is compared to the corresponding spectrum for channel A. If primary signal path 26 is permanently disrupted, or demonstrates an increased fault susceptibility, then, with an appropriate frequency, there will also occur a discrepancy between the reference spectrum and the appertaining spectrum in channel A, so that the presence of an error or an increased error susceptibility may be detected. The advantage of this specific embodiment is that the additional calculating load of second processor 32 is reduced to one quarter, compared to FIG. 2.

Figure 4:
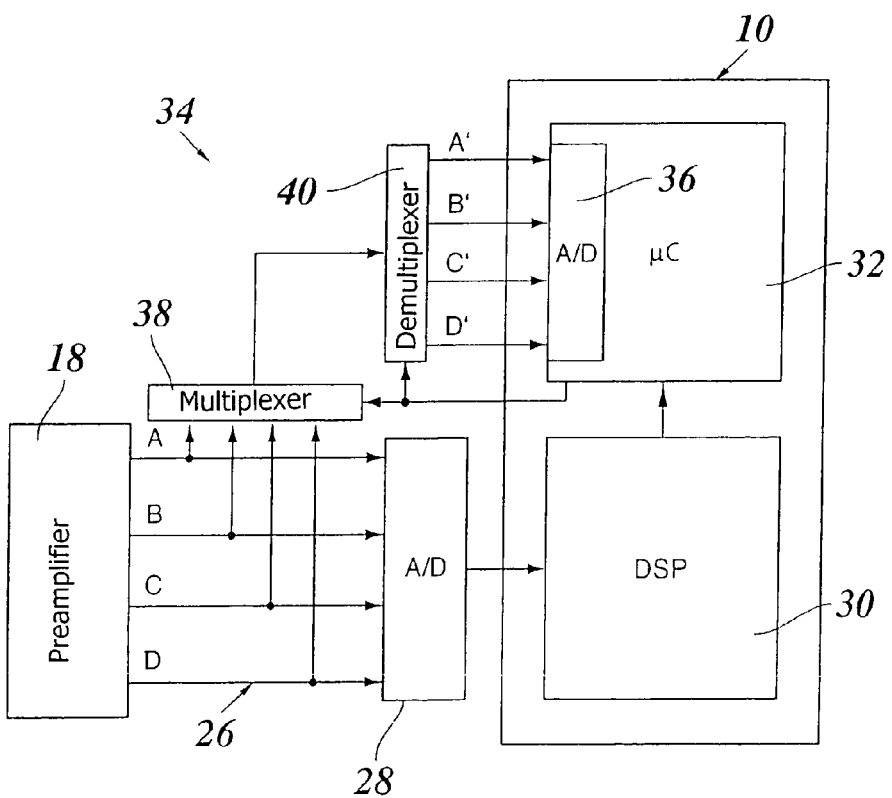

FIG. 4 shows an exemplary embodiment in which redundant signal path 34 has a multiplexer 38 and a demultiplexer 40. In multiplexer 38, the analog signals of channels A-D are combined, and in demultiplexer 40 they are subdivided again into separate channels A'-D'. The multiplexer and the demultiplexer are synchronized by a signal of control and evaluation unit 10. Besides that, the functioning is analogous to that in FIG. 2.

In a time multiplex, however, the sampling times available for channels A'-D' are shortened by one quarter compared to the sampling times for channels A-D, with the result that the reference spectra are only able to be calculated using a lower resolution. In general, this lower resolution is sufficient, however, for making a meaningful comparison of the spectra. Here too, the calculating load of second processor 32 is reduced.

Mixed forms of the exemplary embodiments according to FIGS. 2 and 4 are also possible, such as by, in each case, multiplexing only two channels.

Figure 5:
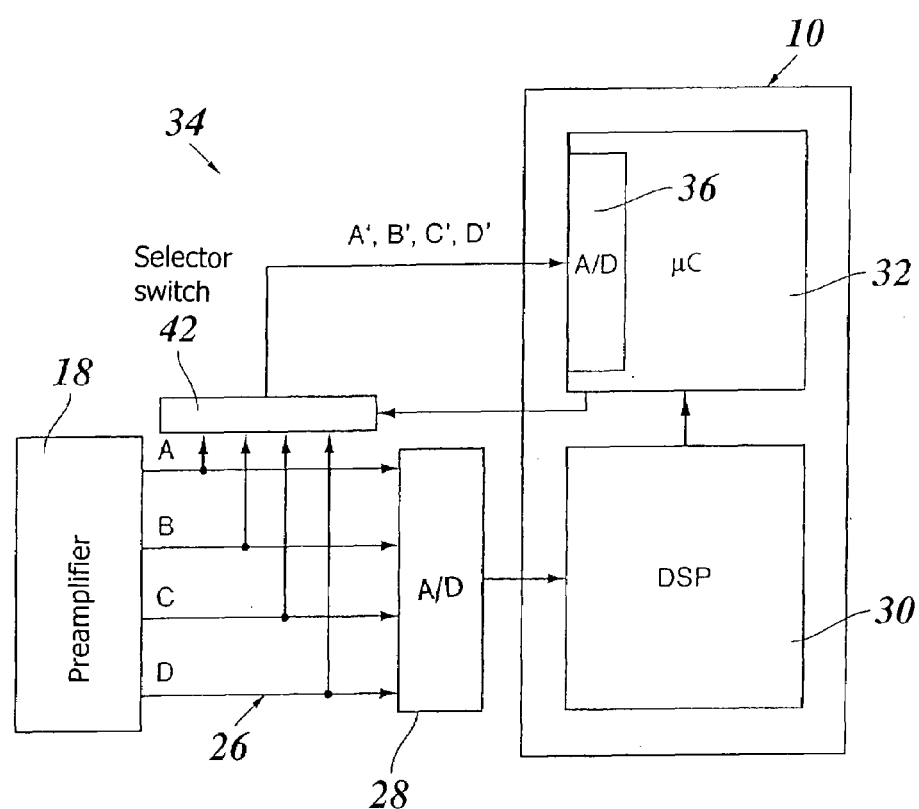

FIG. 5 shows an exemplary embodiment in which redundant signal path 34 includes a selector switch 42, which switches channels A-D, one after another, to the only input of analog/digital converter 36. Thus, for example, in one measuring cycle, only one reference spectrum is calculated for channel A, then in the next measuring cycle for channel B, and so forth, so that after four cycles all the channels have been checked. Similarly, as in FIG. 3, here too, the calculating load of second processor 32 is reduced. However, the advantage is that situations may also be detected in which, for example, the analog output of preamplifier 18 is strongly noise-infested for one of channels B-D, and it leads to an increased frequency of errors.

The exemplary embodiments described make possible a great flexibility and the adjustment of the capacity utilization of the second processor to the respective requirements. If the second processor is heavily loaded with other tasks, the calculation of the reference spectra may, for instance, be stopped temporarily, in order to free up additional calculating capacity. In the case of FIGS. 2 and 4, it is also possible to limit the number of channels for which the reference spectrum is calculated.

Furthermore, in the manifold functions which second processor 32 has to fulfill, weighting according to priorities may be undertaken. If, for example, the radar system is being used for a pre-crash function, then, in a critical situation, if an acute danger of collision is determined, the pre-crash function has a higher priority than the normal clearance regulation. It is then possible to stop the clearance regulation temporarily and to utilize the calculating capacity obtained thereby to calculate the reference spectra, so that, within the scope of the pre-crash function, great reliability may be achieved or maintained in the location of the radar targets.

Likewise, in a critical situation, the tracking of the radar target, to which the collision danger relates, will have the highest priority. Therefore, in order to apply the available calculating capacity in a goal-directed manner, in this situation the tracking of radar targets may be limited to those objects to which the danger of a collision relates.

In critical situations it is also expedient to abbreviate the cycle time of the radar system, so that the objects, or at least the most safety-relevant object, may be tracked using greater temporal resolution. However, this requires a greater calculating capacity, since then only a lesser time is available for the evaluation of the data. If necessary, in this case, the calculation of the reference spectra may be limited or stopped, in order to make possible a greater temporal resolution, while doing without redundancy. If applicable, in this situation, processors 30 and 32 may also be used in a mode of division of labor in calculating the spectra. Thus, for example, first processor 30 could calculate the spectra for the two channels C and D, while parallel to it processor 32 is calculating the spectra for channels A' and B', these spectra, however, now not being used as reference spectra, but being evaluated directly. In this way, the time required in total for the calculation of the spectra is halved.

What is claimed is:

1. A radar system for a motor vehicle, comprising:
   an antenna;
   a first processor for transforming signals supplied by the antenna via a primary signal path into a spectrum; and
   a second processor for additional evaluation of the spectrum,
   at least a part of the signals received by the antenna being able to be supplied to the second processor via a redundant signal path while by-passing the first processor, the second processor transforming the signals into a spectrum;
   wherein the primary signal path includes an analog/digital converter, the redundant signal path including a further analog/digital converter,
   wherein the antenna is a multibeam antenna and the primary signal path includes a plurality of parallel channels, and
   wherein the redundant signal path includes a plurality of parallel channels, which each branch off from one of the channels of the primary signal path.

2. The radar system according to claim 1, wherein the redundant signal path includes a multiplexer and a demultiplexer.

3. The radar system according to claim 2, wherein the multiplexer and the demultiplexer for multiplexing and demultiplexing analog signals are situated on an input side of the further analog/digital converter.

4. The radar system according to claim 1, wherein a number of the channels of the redundant signal path is less than a number of the channels of the primary signal path.

5. The radar system according to claim 4, wherein the redundant signal path includes a selector switch for switching the channels of the primary signal path one after another to at least one of the channels of the redundant signal path.

* * * * *